United States Patent
Singh et al.

(10) Patent No.: US 9,191,873 B1
(45) Date of Patent: Nov. 17, 2015

(54) METHOD AND SYSTEM FOR CIRCUIT-SWITCHED FALLBACK

(71) Applicant: Sprint Spectrum L.P., Overland Park, KS (US)

(72) Inventors: Jasinder P. Singh, Olathe, KS (US); Maulik K. Shah, Overland Park, KS (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 55 days.

(21) Appl. No.: 13/714,833

(22) Filed: Dec. 14, 2012

(51) Int. Cl.
*H04W 36/00* (2009.01)
*H04W 36/30* (2009.01)

(52) U.S. Cl.
CPC ..................... *H04W 36/30* (2013.01)

(58) Field of Classification Search
CPC ................................ H04W 36/00; H04Q 7/20
USPC ......... 455/436, 452.1, 423.1, 67.11; 370/230, 370/331, 332
See application file for complete search history.

(56) References Cited

U.S. PATENT DOCUMENTS

| | | | | |
|---|---|---|---|---|
| 8,265,627 | B2* | 9/2012 | Ergen et al. | 455/436 |
| 2008/0070576 | A1* | 3/2008 | Sanders et al. | 455/436 |
| 2010/0202413 | A1* | 8/2010 | Vikberg et al. | 370/332 |
| 2010/0317375 | A1* | 12/2010 | Burbidge et al. | 455/458 |
| 2011/0149907 | A1* | 6/2011 | Olsson et al. | 370/331 |
| 2012/0028661 | A1 | 2/2012 | Fang et al. | |
| 2012/0064885 | A1 | 3/2012 | Ramachandran et al. | |
| 2014/0078898 | A1* | 3/2014 | Anchan et al. | 370/230 |
| 2014/0348014 | A1* | 11/2014 | Teshima et al. | 370/252 |

OTHER PUBLICATIONS

Unpublished U.S. Appl. No. 13/714,922, filed Dec. 14, 2012, with inventors Jasinder P. Singh et al., entitled "Method and System for Paging Wireless Communication Devices".
Unpublished U.S. Appl. No. 13/648,919, filed Oct. 10, 2012, with inventors Siddharth S. Oroskar et al., entitled "Adjustment of Communication Parameters in a Coverage Area Based on Prevalence of eCSFB Devices in the Coverage Area".
Unpublished U.S. Appl. No. 13/648,918, filed Oct. 10, 2012, with inventors Siddharth Oroskar et al., entitled "Adjustment of Zone-Based Paging Based on the Prevalence of eCSFB Devices".

(Continued)

*Primary Examiner* — Lester Kincaid
*Assistant Examiner* — Gary LaFontant (57) ABSTRACT

A method and system for circuit-switched fallback (CSFB) is disclosed. A first wireless network may receive from a wireless communication device (WCD) a report including an indication of radio frequency (RF) quality of a second wireless network. The first wireless network may make a determination of whether the reported indication of RF quality exceeds a threshold. If the determination is that the reported indication of RF quality exceeds the threshold, the first wireless network may send the reported indication of RF quality to the second wireless network. However, if the determination is that the reported indication of RF quality does not exceed the threshold, the first wireless network may direct the WCD to hand off to the second wireless network and refrain from sending the reported indication of RF quality to the second wireless network.

22 Claims, 4 Drawing Sheets

(56) References Cited

OTHER PUBLICATIONS

Qualcomm, "Circuit-switched fallback. The first phase of voice evolution for mobile LTE devices," White Paper, pp. 1-10, 2012.

Tanaka et al., Technology Reports, "CS Fallback Function for Combined LTE and 3G Circuit Switched Services," Technical Journal vol. 11, No. 3, Sep. 2009.

* cited by examiner

METHOD AND SYSTEM FOR CIRCUIT-SWITCHED FALLBACK

BACKGROUND

To provide cellular wireless communication service, a wireless service provider or "wireless carrier" typically operates a radio access network (RAN) that defines one or more coverage areas in which wireless communication devices (WCDs) can be served by the RAN and can thereby obtain connectivity to broader networks such as the public switched telephone network (PSTN) and the Internet. A typical RAN may include one or more base transceiver stations (BTSs) (e.g., macro network cell towers and/or femtocells), each of which may radiate to define a cell and cell sectors in which WCDs can operate. Further, the RAN may include one or more base station controllers (BSCs) (which may also be referred to as radio network controllers (RNCs)) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other wireless communication device (WCD) that is positioned within coverage of the RAN can then communicate with a BTS and in turn, via the BTS, with other served devices or with other entities on the transport network.

Wireless communications between a WCD and a serving BTS in a given coverage area will typically be carried out in accordance with one or more agreed air interface protocols that define a mechanism for wireless exchange of information between the WCD and BTS.

Examples of such protocols include CDMA (e.g., EIA/TIA/IS-2000 Rel. 0, A (commonly referred to as "IS-2000" or "1xRTT"), EIA/TIA/IS-856 Rel. 0, A, or other version thereof (commonly referred to as "IS-856", "1xEV-DO", or "EVDO")), iDEN, WiMAX (e.g., IEEE 802.16), Long-Term Evolution (LTE), TDMA, AMPS, GSM, GPRS, UMTS, or EDGE, and others now known or later developed.

The air interface protocol will generally define a "forward link" encompassing communications from the BTS to WCDs and a "reverse link" encompassing communications from WCDs to the BTS. Further, each of these links may be structured to define particular channels, through use of time division multiplexing, code division multiplexing (e.g., spread-spectrum modulation), frequency division multiplexing, and/or some other mechanism.

The forward link, for example, may define (i) a pilot channel on which the RAN may broadcast a pilot signal to allow WCDs to detect wireless coverage, (ii) system parameter channels (e.g., a sync channel) on which the RAN may broadcast system operational parameters for reference by WCDs so that the WCDs can then seek network access, (iii) paging channels on which the RAN may broadcast page messages to alert WCDs of incoming communications, and (iv) traffic channels on which the RAN may transmit bearer traffic (e.g., application data) for receipt by WCDs. And the reverse link, for example, may define (i) access channels on which WCDs may transmit "access probes" such as registration messages and call origination requests, and (ii) traffic channels on which WCDs may transmit bearer traffic for receipt by the RAN.

In a conventional CDMA wireless network compliant with the well-known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When a WCD operates in a given sector, communications between the WCD and the BTS of the sector are carried on a given frequency and are encoded by the sector's PN offset and a given Walsh code.

When a RAN receives an incoming communication for a WCD, the RAN typically pages the WCD via a paging channel in at least the coverage area in which the WCD last registered. When a cellular wireless communication system seeks to page a WCD (e.g., for an incoming call or for some other reason), a switch in the network may send the page message to numerous base stations in the switch's coverage area, with the hope that when the base stations broadcast the page message, the WCD will receive the page message in one of the associated sectors, and will respond. Further, a switch may be configured to re-send a page in the event that a given attempt to page a WCD fails.

Wireless service providers typically design their wireless networks to comprise a number of partially-overlapping wireless coverage areas. As a WCD that is subscribed to a wireless service provider moves about, the wireless network may hand off the WCD from one wireless coverage area to another. A goal of performing such handoffs is to provide a substantially continuous wireless coverage to the WCD, so that any communication sessions conducted by the WCD are not dropped or degraded due to loss of wireless coverage.

OVERVIEW

A method and system is disclosed for circuit-switched fallback (CSFB). An example method involves a first wireless network receiving from a wireless communication device a report including an indication of radio frequency (RF) quality of a second wireless network. The example method further involves the first wireless network making a determination of whether the reported indication of RF quality exceeds a threshold. Still further, the example method involves (i) if the determination is that the reported indication of RF quality exceeds the threshold, the first wireless network sending the reported indication of RF quality to the second wireless network, whereby the second wireless network then assigns an air-interface traffic channel for the wireless communication device and the wireless communication device hands off from the first wireless network to the second wireless network, but (ii) if the determination is that the reported indication of RF quality does not exceed the threshold, the first wireless network directing the wireless communication device to hand off to the second wireless network and the first wireless network refraining from sending the reported indication of RF quality to the second wireless network. In an example embodiment, the system may be a wireless network that includes an antenna, a memory, and a processor. The antenna may radiate to define a coverage area. The memory may be configured to store program instructions. Further, the processor may be capable of executing the program instructions to: (i) receive from a wireless communication device a report including an indication of RF quality of a second wireless network; (ii) make a determination of whether the reported indication of RF quality exceeds a threshold; and (iii) if the determination is that the reported indication of RF quality exceeds the threshold, send the reported indication of RF quality to the second wireless network, whereby the second wireless network then assigns an air-interface traffic channel for the wireless communication device and the wireless communication device hands off from the wireless network to the second wireless network, but (iv) if the determination is that the reported indication of RF quality does not exceed the threshold, direct the wireless communication device to hand off to the second wireless network and refrain from sending the reported indication of RF quality to the second wireless network.

In another example aspect, a non-transitory computer readable medium may have stored therein instructions that are executable to cause at least one component of a first wireless network to perform functions comprising: (a) receiving from a wireless communication device a report including an indication of RF quality of a second wireless network; (b) making a determination of whether the reported indication of RF quality exceeds a threshold; and (c) (i) if the determination is that the reported indication of RF quality exceeds the threshold, sending the reported indication of RF quality to the second wireless network, whereby the second wireless network then assigns an air-interface traffic channel for the wireless communication device and the wireless communication device hands off from the first wireless network to the second wireless network, but (ii) if the determination is that the reported indication of RF quality does not exceed the threshold, directing the wireless communication device to hand off to the second wireless network and refraining from sending the reported indication of RF quality to the second wireless network.

These as well as other aspects, advantages, or alternatives will become apparent to those of ordinary skill in the art by reading the following detailed description, with reference where appropriate to the accompanying drawings. Further, it should be understood that the description provided by this overview section and elsewhere in this document is intended to explain and illustrate the invention by way of example only.

DETAILED DESCRIPTION

1. Overview of an Example Method and System

Disclosed herein is a method and system for circuit-switched fallback (CSFB). In particular, the disclosed method and system may provide for transfer of a wireless communication device (WCD) from a first wireless network to a second wireless network in a CSFB scenario. In accordance with an example embodiment, the first wireless network may operate according to a first air-interface protocol and the second wireless network may operate according to a second air-interface protocol different than the first air-interface protocol. For example, the first air-interface protocol may be a Long-Term Evolution (LTE) protocol and the second air-interface protocol may be a Code Division Multiple Access (CDMA) protocol.

In an example, the method may be implemented by a radio access network (RAN) that provides wireless service in the coverage area using an LTE wireless communication protocol. In networks that provide service under both LTE and an older CDMA protocol (e.g., IS-2000 and/or IS-856), service providers may implement CSFB and/or enhanced CSFB (eCSFB) functionality, which allow service providers to use their older existing CDMA network for voice calls, while at the same time using LTE to support mobile broadband.

Under CSFB, a WCD may, by default, operate with its CDMA receiver powered down, and only listen for pages via an LTE paging channel. Thus, when a RAN needs to page a wireless communication device for a voice call, the RAN may first page the WCD via an LTE paging channel. In particular, in a CSFB scenario, when the 3G (e.g., CDMA) network seeks to page a WCD, the CDMA network sends a signal to the LTE network, and an eNodeB transmits the signal to the WCD. Upon response from the WCD, the eNodeB sends a message to the WCD to direct the WCD to go acquire CDMA connectivity and the eNodeB suspends LTE service to the WCD. The WCD then scans for CDMA coverage and goes through an acquisition process with the CDMA network, including, for example, reading the pilot and sync channels, and requesting and receiving assignment of a traffic channel. The CDMA network then associates that traffic channel with the page to set up a call to the WCD.

When eCSFB is implemented, a RAN may generally use its 3G traffic channels for voice calls and 1x-data calls, while using LTE signaling channels for all other functionality. As a result, a base station that implements eCSFB may use the LTE control channel for both LTE control channel messages and CDMA control-channel and paging-channel messages (e.g., for CDMA paging, CDMA call origination, SMS, CDMA feature notification, and other CDMA overhead message), whenever the device with which it is communicating is compatible with such functionality. In particular, in an eCSFB scenario, when the 3G (e.g., CDMA) network seeks to page a WCD, the CDMA network sends a signal to the LTE network, and an eNodeB transmits the signal to the WCD.

However, in contrast to a standard CSFB scenario, once the WCD responds to the eNodeB, the eNodeB sends access information (e.g., SIB8 access information) to the WCD. The WCD then measures pilot signal strength of the CDMA network and sends a measurement report to the eNodeB, identifying detected PNs and pilot strengths. The LTE network then forwards that measurement report to the CDMA network. The CDMA network assigns a traffic channel on one of the detected PNs and signals back to the LTE network with the channel assignment information, and the eNodeB then passes that channel assignment information to the WCD. The WCD then quickly moves over to operating on that channel of the CDMA system, without needing to go through the acquisition process that it would go through with standard CSFB. Generally, the eCSFB process therefore may be faster than a standard CSFB process in setting up a call for the WCD on the CDMA network.

The eCSFB process can be problematic, since it assumes that if a WCD detects sufficient pilot strength the WCD will also be able to decode the traffic channel in the detected system. In reality, however, pilots may be stronger than traffic channels. So merely being able to decode a pilot signal does not mean the WCD will be able to also decode the traffic channel. In some systems, the sync channel is not as strong as the pilot channel but may be a bit stronger than the traffic channel. The CSFB process that includes decoding the sync channel helps to ensure that the device will ultimately be able to decode the traffic channel. However, the eCSFB process excludes this decoding of the synch channel.

The disclosed method and system offer an improved way to handle transfer of a WCD from a first wireless network to a second wireless network in a CSFB-type scenario (e.g., scenario in which the WCD transfers from a 4G (e.g., LTE) network to a 3G (e.g., CDMA) network). In accordance with at least one embodiment, the disclosed method includes a first wireless network receiving from a wireless communication device a report including an indication of radio frequency (RF) quality of a second wireless network. The disclosed method then includes the first wireless network making a determination of whether the reported indication of RF quality exceeds a threshold. Further, the disclosed method includes (i) if the determination is that the reported indication of RF quality exceeds the threshold, the first wireless network sending the reported indication of RF quality to the second wireless network, whereby the second wireless network then assigns an air-interface traffic channel for the wireless communication device and the wireless communication device hands off from the first wireless network to the second wireless network, but (ii) if the determination is that the reported indication of RF quality does not exceed the threshold, the first wireless network directing the wireless communication device to hand off to the second wireless network and the first wireless network refraining from sending the reported indication of RF quality to the second wireless network.

In accordance with an example embodiment, the reported indication of RF quality may be an indication of signal strength of the second wireless network measured by the wireless communication device or an indication of a signal-to-noise ratio of the second wireless network measured by the wireless communication device.

2. Example Communication System Architecture

Figure 1:
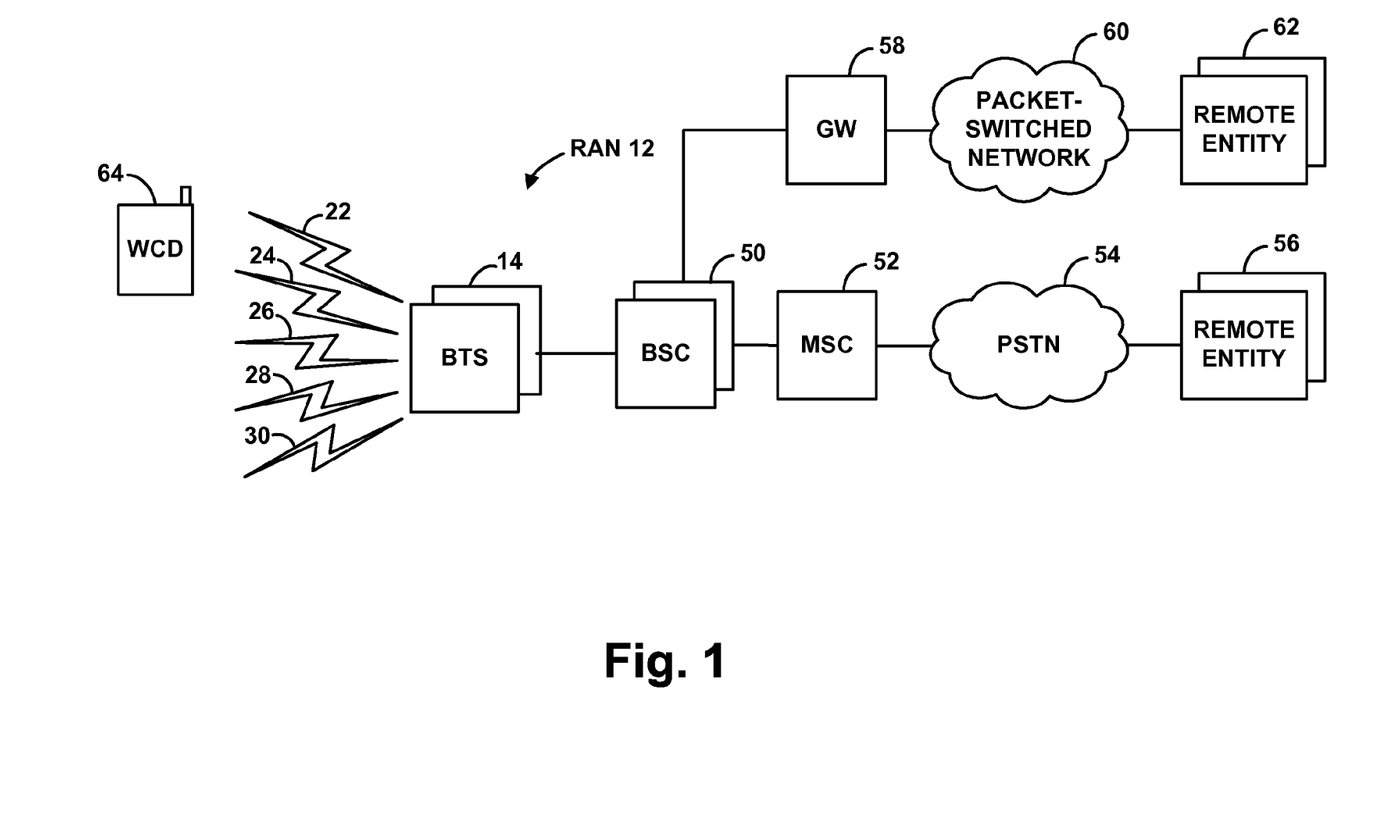
FIG. 1 is a simplified block diagram of a wireless communication system in which an exemplary embodiment of the present method can be implemented.

FIG. 1 is a simplified block diagram of an example communication system in which the proposed method can be implemented. It should be understood that numerous variations from the arrangement and functions shown are possible while remaining within the scope and spirit of the claims. For instance, elements may be added, removed, combined, distributed, substituted, re-positioned, re-ordered, or otherwise changed. Further, where this description refers to functions being carried out by an entity such as a mobile station or a RAN (or other network component), it will be understood that the entity can carry out the functions by itself or with the assistance of other entities, and through application of hardware, firmware and/or software logic. For instance, the entity may include a processor programmed with instructions to implement the functions described. Still further, it should be understood that all of the discussion above is considered part of this detailed disclosure.

As noted above, service providers may implement networks in which service is provided under a CDMA standard (e.g., IS-95, IS-2000, 1xRTT, 1xEV-DO, etc.) as well as under a 4G protocol such as LTE and/or WiMax. Service under both CDMA and LTE (or WiMAX) may be implemented in conjunction with the arrangement shown in FIG. 1, and more specific details of a network with overlapping CDMA and LTE will be discussed with reference to FIG. 2.

As shown in FIG. 1, an exemplary network may include a RAN 12 that radiates to define one or more coverage areas in which WCDs can engage in RF communication with the RAN 12. FIG. 1 depicts representative coverage areas 22-30 by way of example. Herein, WCDs may also be referred to as "mobile stations," as is common when referring to WCDs in the context of a CDMA network, and also as "user entities" (UEs), as is common when referring to WCDs in the context of an LTE network. Thus, the terms "mobile station," "wireless communication device" (or WCD), and "user entity" (or UE) may be used interchangeably herein.

The RAN 12 may define the one or more coverage areas 22-30 discretely through use of directional antennas and/or by various modulation parameters, including, without limitation, carrier frequencies, PN offsets, and/or other parameters, depending on the air interface protocol used. Example air interface protocols include CDMA (e.g., IS-95, IS-2000, 1xRTT, 1xEV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas 22-30 may overlap to some extent, so that a served WCD can move seamlessly from one coverage area to another.

As shown, the RAN 12 may include one or more base stations 14 (also referred to as "base transceiver stations" (BTSs)), and one or more base station controllers (BSCs) 50 (which may be integrated with or separate entities from the one or more of the base stations). The base stations 14 may include directional antennas, power amplifiers, and associated transceiver equipment arranged to establish corresponding wireless coverage areas and to communicate with WCDs in those coverage areas 22-30.

The coverage areas 22-30 served by the one or more base stations 14 may be cell sectors, or some other defined wireless coverage area (possibly even a combination of coverage provided by multiple base stations). Each base station 14 may serve a single coverage area (e.g., a single cell or sector), or may serve multiple discrete coverage areas, such as multiple sectors, for instance.

Each BSC 50 may be coupled with one or more switches, such as a mobile switching center (MSC) 52, which provides connectivity with the public-switched telephone network (PSTN) 54, so that served WCDs can communicate with remote entities 56 on the PTSN. Additionally or alternatively, each BSC may be coupled with one or more gateways, such as packet data serving node (PDSN) 58, which provides connectivity with a packet-switched network 60, so that served WCDs can communicate with remote entities 62 on the packet-switched network.

Note that the combination of BTS 14 and BSC 50 may be considered a base station. However, BTS 14 or BSC 50 could, taken alone, be considered a base station as well. Additionally, a base station may be considered to be either or both of those devices, and perhaps make use of one or more functions provided by an MSC, a PDSN, and/or any other entity.

FIG. 1 depicts a representative WCD 64 by way of example, and this WCD 64 could be a cell phone, tablet, laptop computer, wirelessly equipped personal digital assistant (PDA), personal computer, home electronic device, or any other type of wirelessly-equipped device now known or later developed. WCD 64 may be equipped with hardware, software, and/or other logic to communicate with RAN 12 in accordance with an agreed communication protocol, such as one of the protocols noted herein for instance. For example, in an exemplary embodiment, a WCD includes a wireless communication interface that functions to facilitate air interface communication with RAN 12 according to LTE.

Further, WCD 64 may include a user interface, which typically includes components for receiving input from a user of WCD 64 and providing output to a user of the WCD 64. Yet further, WCD 64 may include program logic stored in data storage (e.g., one or more volatile and/or non-volatile storage components of the WCD, such as magnetic, optical, or organic storage components) and executable by one or more processors (e.g., general purpose and/or special purpose processors) to carry out various functions described herein.

Each mobile station operating in the RAN 12, such as WCD 64, typically has at least one associated identifier that uniquely identifies the mobile station. By way of example, a mobile station may have a unique mobile directory number (MDN), a unique International Mobile Subscriber Identity (IMSI), a unique MAC address, or some other identifier dynamically or statically assigned to the mobile station, which may serve as its address for receiving air interface communications transmitted to it by the RAN 12. As a specific example, an IMSI is a unique number associated with the mobile station, typically taking the form of the mobile station's phone number. Additionally or alternatively, each mobile station may be assigned a mobile identification number (MIN).

Figure 2:
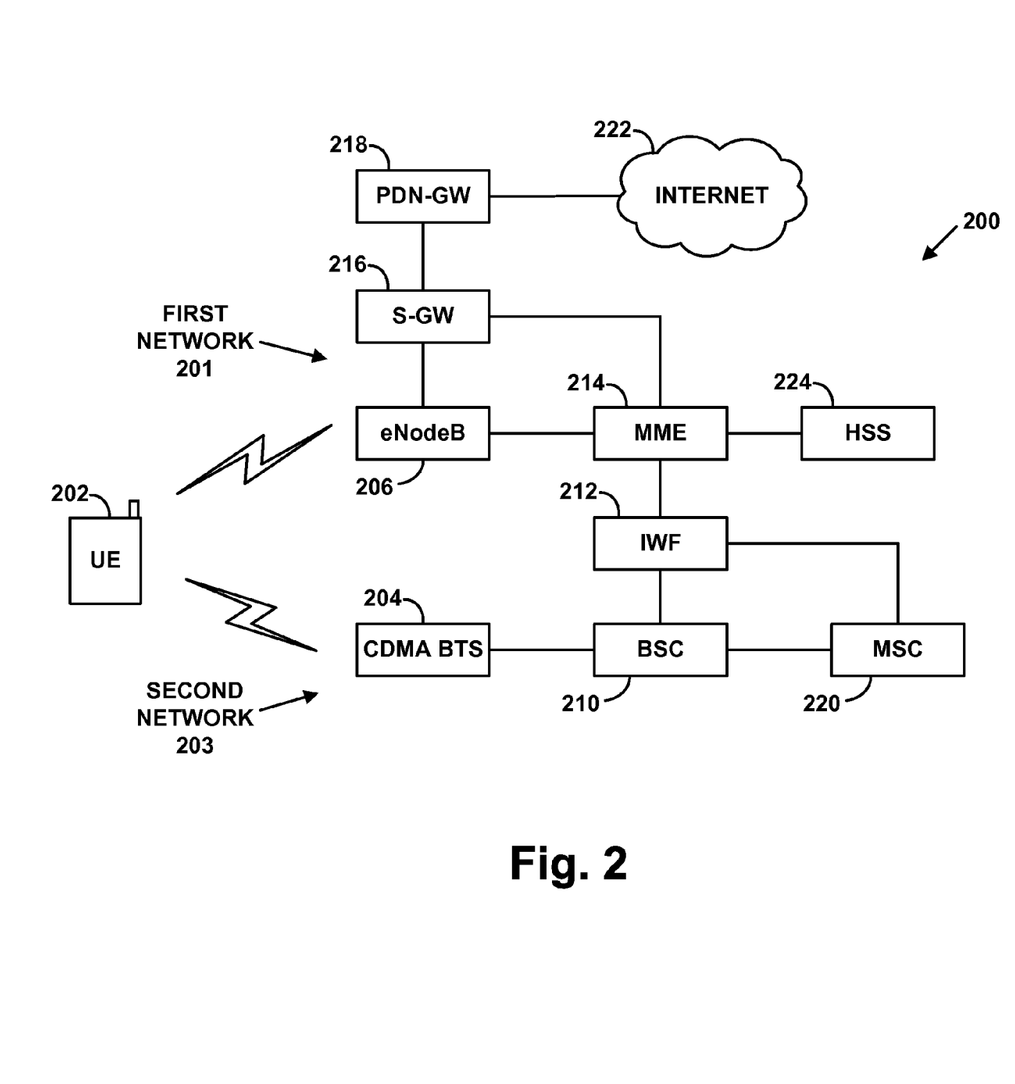
FIG. 2 is a simplified block diagram of a wireless communication system in which a service provider supports wireless service under two or more different air interface protocols, according to an exemplary embodiment.

FIG. 2 is another simplified block diagram of an example wireless communication system in which the disclosed method may be implemented. In particular, FIG. 2 illustrates a wireless communication system 200 in which a service provider supports wireless service under two or more different air interface protocols. The example of FIG. 2 shows an exemplary RAN that is configured to provide service under both CDMA and LTE.

As such, a UE 202 operating in system 200 may connect and communicate under different air-interface protocols, such as CDMA and LTE. In practice, system 200 may include two or more separate access networks with overlapping coverage areas (e.g., separate access networks for LTE and CDMA). For example, wireless communication system 200 illustrates an exemplary RAN comprising a first wireless network 201 and a second wireless network 203. In this example, the first wireless network 201 is configured to provide service under LTE, and the second wireless network 203 is configured to provide service under CDMA. Alternatively, some or all components may be combined so as to support both CDMA and LTE communications, for example.

In the illustrated configuration, system 200 (and in particular second wireless network 203) includes components to provide for CDMA communications. Specifically, FIG. 2 shows a BTS 204, a BSC 210, and an MSC 220, which collectively (and possibly in conjunction with other components that help to provide service under CDMA) may be referred to as CDMA network 203. Note that BTS 204, BSC 210, and MSC 220 may be configured for the same or similar functions as BTS 14, BSC 50, and MSC 52, which were described in reference to FIG. 1.

System 200 also includes components to provide a UE 202 with service under LTE. In particular, system 200 (and more particularly second wireless network 201) includes one or more eNodeBs 206, which are base stations configured to support over-the-air communications with UEs 202 under LTE. Each eNodeB 206 may provide service under LTE in one or more coverage areas, such as a cell or one or more cell-sectors. To support LTE communications, system 200 also includes a mobility management entity (MME) 214, which may be configured to control communications between one or more eNodeBs 206 and a serving gateway (S-GW) 216. MME 28 may also be communicatively coupled to a home subscriber server (HSS) 224, which stores subscriber information, such as information related to UE 202. More generally, an MME 214 may support functionality such as mobility management, bearer management, paging-message distribution, security functions, authentication of UEs, gateway selection for communications, and so on.

In an exemplary configuration, S-GW 216 may be configured to communicate with one or more eNodeBs 206 and/or with MME 214 in order to provide various functions such as packet routing and forwarding, mobility anchoring, packet buffering, and so on. For instance, S-GW 216 may provide packet routing for LTE communications to and/or from UE 202. Yet further, an LTE access network 201 may include a packet data network gateway (PDN-GW) 218, which facilitates packet-data communications between an S-GW 216 that operates according to LTE, and a packet-data network, such as the Internet 222.

In a further aspect, system 200 includes an interworking function (IWF) 212, which may be a functional component of the system that supports interworking between different wireless technologies, such as CDMA and LTE. In an exemplary configuration, IWF 212 may support communications between components of LTE network 201 (e.g., MME 214) and components of CDMA network 203 (e.g., BSC 210 and/or MSC 220), so that a service provider may implement CSFB or eCSFB functionality.

CSFB may allow a service provider to deliver voice-services to a UE 202, and/or to provide data provide data services under a CDMA protocol to UE 202, which is not configured for LTE communications. The LTE network 201 and the CDMA network 203 (e.g., the fall back network) may be connected via a tunnel, such as IWF 212.

A UE 202 that is configured for CSFB or eCSFB may register with the CDMA-portion of system 200 via an LTE access channel. More specifically when a UE 202 connects to LTE network 201 via an eNodeB 206, it can communicate with CDMA MSC 220 through an IWF 212, which functions to bridge the LTE network 201 and CDMA network 203, encapsulate and relay CDMA messages between the UE 202 and the MSC 220. For example, a UE 202 may send CDMA messages via an eNodeB 206 and an MME 214. The IWF 212 may then encapsulate and relay such CDMA messages to MSC 220.

Further, a UE 202 that is configured for CSFB may use an LTE access channel to initiate a voice call under CDMA. For instance, when a CSFB device requests to initiate a voice call via an LTE access channel, the LTE network 201 may then notify the CDMA network 203 of the voice call via the bridge provided by IWF 212, so that the call may be established via the CDMA network 203. For example, MME 214 may notify MSC 220 of UE 202's request to initiate a voice call via IWF 212, so that MSC 220 may reserve CDMA resources for the call.

Yet further, under CSFB, all paging functionality for both CDMA and LTE communications may be carried out via the LTE paging channel, unless the target UE of the paged is not configured for CSFB, in which case the CDMA paging channel is used instead. Thus, if most of UEs in a certain geographic area are configured for CSFB, the number of paging-channel messages being sent via the CDMA paging channel may be significantly reduced.

It should be understood that the network arrangements shown in FIGS. 1 and 2 and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium (i.e., data storage, rather than a mere signal), to achieve, for instance the useful, concrete, and tangible result of helping to improve the paging success rate in an access network.

3. Example RAN Components

Figure 3:
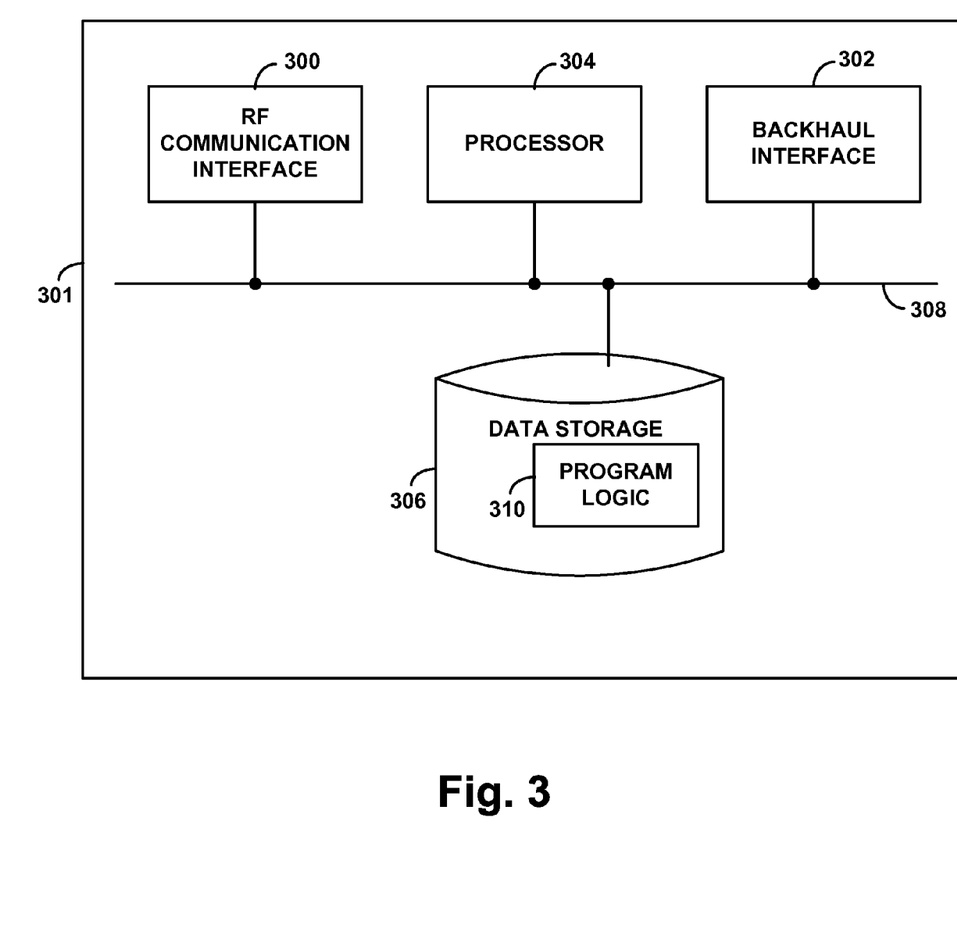
FIG. 3 is a simplified block diagram exemplifying a RAN component, according to an exemplary embodiment.

FIG. 3 is a simplified block diagram exemplifying a RAN or RAN component, according to an exemplary embodiment. In particular, FIG. 3 illustrates some of the components that would likely be found in a RAN component 301 arranged to operate in accordance with the embodiments herein. As shown, the RAN component 301 may include an RF communication interface 300, a backhaul interface 302, a processor 304, and data storage 306, all of which may be communicatively linked together by a system bus, network, or one or more other connection mechanisms 308.

In practice, RAN component 301 may take the form of or include one or more BTS and/or a BSC, such as eNodeB 206 and/or BSC 210 for instance, or may take the form of a switch, such as MSC 220. Accordingly, the illustrated components of RAN component 301 (e.g., communication interface 300, a backhaul interface 302, a processor 304, and data storage 306) may be distributed and/or subdivided between one or more BTSs, a BSC, and/or an MSC, or may be implemented in a single BTS, a single BSC, or a single MSC. It should be understood that an exemplary system may also take the form of another network entity or combinations of other network entities, without departing from the scope of the invention. Further, an exemplary system may be implemented in or provided in communication with a base station (or implemented in or provided in communication with any other network entity or entities arranged to carry out analogous functions).

RF communication interface 300 may comprise one or more antenna structures, one or more power amplifiers, and associated equipment, for engaging in RF communication with mobile stations operating within the base station's coverage, according to one of the air interface protocols noted above for instance. Backhaul interface 302 may comprise any sort of communication link or mechanism enabling the base station to exchange signaling and bearer data with other RAN entities, such as with MSC 220 for instance. Processor 304 may comprise one or more processors (e.g., general purpose and/or special purpose processors), such as microprocessors for instance.

Data storage 306 may be a non-transitory computer readable medium. For example, data storage 306 may take the form of one or more volatile and/or non-volatile storage components, such as magnetic, optical, or organic storage components, integrated in whole or in part with processor 304. As further shown, data storage 306 contains program logic 310 (e.g., machine language instructions) executable by processor 304 to carry out various functions, such as the functionality of the exemplary methods and systems described herein.

In an exemplary embodiment, data storage 306 may include program instructions that are executable to cause a first wireless network (e.g., network 201) or at least one component of the first wireless network to perform functions comprising: (a) receiving from a wireless communication device a report including an indication of RF quality of a second wireless network; (b) making a determination of whether the reported indication of RF quality exceeds a threshold; and (c) (i) if the determination is that the reported indication of RF quality exceeds the threshold, sending the reported indication of RF quality to the second wireless network, whereby the second wireless network then assigns an air-interface traffic channel for the wireless communication device and the wireless communication device hands off from the first wireless network to the second wireless network, but (ii) if the determination is that the reported indication of RF quality does not exceed the threshold, directing the wireless communication device to hand off to the second wireless network and refraining from sending the reported indication of RF quality to the second wireless network.

4. Example Operation

Figure 4:
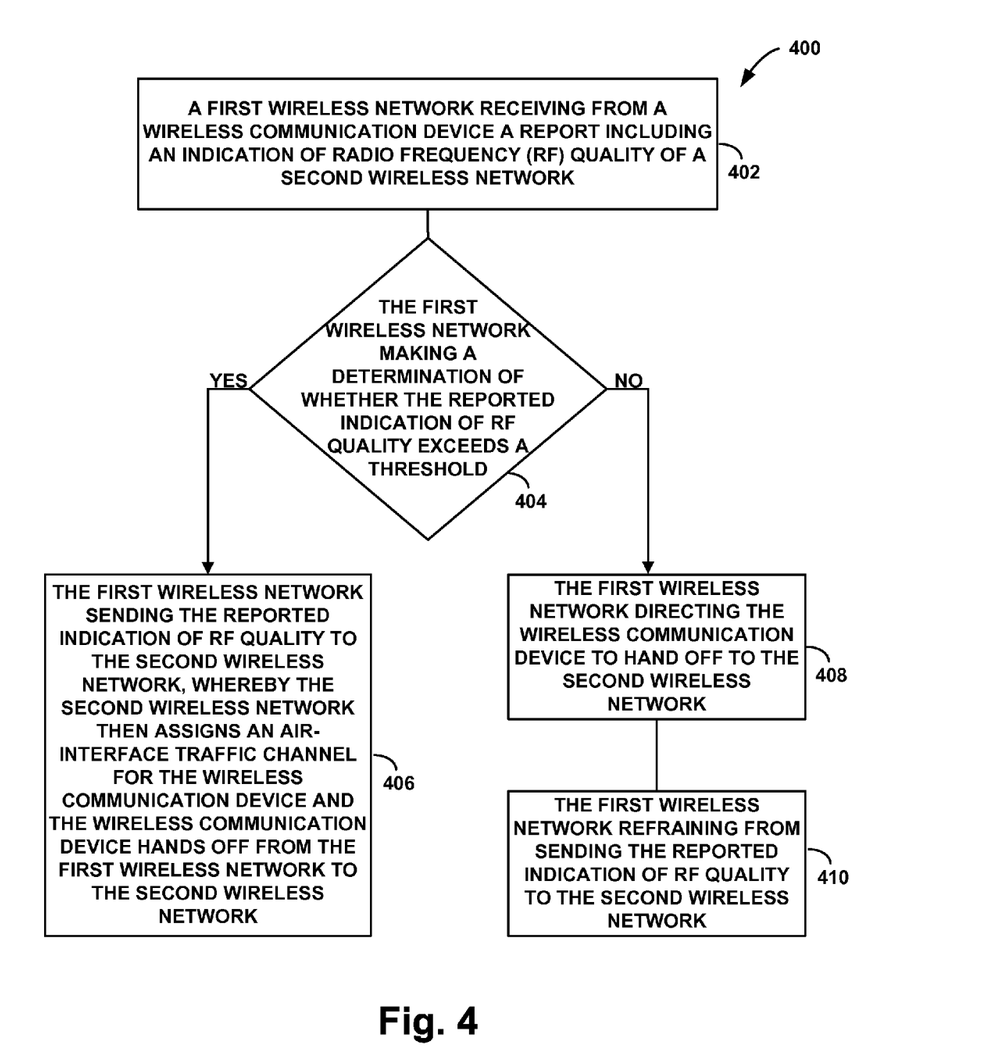
FIG. 4 is a flow chart depicting functions that can be carried out by a system in accordance with an exemplary embodiment of the present method.

FIG. 4 is a flow chart depicting functions that can be carried out in the disclosed process in practice, in accordance with an embodiment of the method. The method 400 of FIG. 4 provides for an improved way of handling CSFB scenarios. As shown in FIG. 4, at block 402, the method involves a first wireless network receiving from a wireless communication device a report including an indication of RF quality of a second wireless network. The method then involves, at block 404, the first wireless network making a determination of whether the reported indication of RF quality exceeds a threshold.

If the determination is that the reported indication of RF quality exceeds the threshold, the method involves, at step 406, the first wireless network sending the reported indication of RF quality to the second wireless network, whereby the second wireless network then assigns an air-interface traffic channel for the wireless communication device and the wireless communication device hands off from the first wireless network to the second wireless network. On the other hand, if the determination is that the reported indication of RF quality does not exceed the threshold, the method involves (i) at step 408, the first wireless network directing the wireless communication device to hand off to the second wireless network, and (ii) at step 410, the first wireless network refraining from sending the reported indication of RF quality to the second wireless network.

In the method of 400, the first wireless network may operate according to a first air-interface protocol and the second wireless network may operate according to a second air-interface protocol. For instance, the first wireless network may operate according to an LTE air-interface protocol and the second wireless network may operate according to a CDMA air-interface protocol.

In an example embodiment, these functions of method 400 could be carried out by a first wireless network such as first wireless network 201 illustrated in FIG. 2. Further, the second network may be a second network such as second wireless network 203, and the WCD may be a WCD such as UE 202. Further, the method 400 may be carried out by a component or a combination of components of the first wireless network 201. For example, the method may be carried out by a first wireless network node such as eNodeB 206.

As a preliminary matter, in an example embodiment method 400 may take place in a scenario in which the second wireless network seeks to establish connectivity with a WCD operating in the first wireless network. For instance, prior to step 402, when the CDMA network 203 seeks to page UE 202, the CDMA network 203 may send a signal to the LTE network 201, and LTE network 201 may transmit the signal to UE 202. Once UE 202 responds to the LTE network 201, the LTE network 201 may send access information (e.g., SIB8 access information) to UE 202. The UE may then measure RF quality of the CDMA network 203 and thereafter send a report including an indication of the RF quality to the LTE network 201.

Returning to FIG. 4, at block 402, the first wireless network 201 receives from UE 202 the report including an indication of RF quality of the second wireless network 203. For instance, UE 202 may send the first wireless network 201 a message that includes an indication of RF quality of the second wireless network 203 in response receiving the message from the LTE network that the CDMA network seeks to page UE 202.

The reported indication of RF quality may be any suitable indication of RF signal strength and/or quality. UE 202 may, for instance, measure the signal strength of the second wireless network 203 as $E_C/I_O$ values. This ratio is a ratio comparing (a) the power level at which the UE 202 is receiving the forward link pilot channel ("$E_C$" for "energy per chip") and (b) the power level at which the UE 202 is receiving all transmissions ("$I_O$") on the frequency carrier on which the UE 202 is operating (including the forward link pilot channel). It should be understood, however, that the UE 202 could measure signal strengths of the second wireless network 203 in terms of parameters other than $E_C$ and $I_O$. In another example, the reported indication of RF quality is an indication of a signal-to-noise ratio of the second wireless network 203 measured by the UE 202. Other example indications of signal strength of the second wireless network 203 measured by the UE 202 are possible as well.

Returning to FIG. 4, at block 404, first wireless network 201 makes a determination of whether the reported indication of RF quality exceeds a threshold. The threshold may be any suitable threshold. Generally, this determination may help the first wireless network identify whether connecting the UE 202 to the second wireless network via an eCSFB process or a CSFB process is appropriate for the given UE 202. For instance if the detected pilot strength does not exceed threshold, it may be appropriate for the LTE network to switch from eCSFB to CSFB, by just directing the WCD to go acquire CDMA connectivity (which will cause the UE 202 to go through the normal process of decoding the sync channel, etc., thereby helping to ensure that the UE 202 would be able to decode the CDMA traffic channel). On the other hand, if the LTE network 201 determines that the detected pilot strength exceeds the threshold, then it may be appropriate for the LTE network 201 to continue with use of eCSFB, thus bypassing the sync channel decoding, etc., as there is a good chance that all signals the UE 202 will detect from the CDMA system will be strong enough.

In an example, the threshold is an RF-quality threshold associated with a given handoff success rate. For instance, the given handoff success rate may be a success rate above 95%. However, other handoff success rates above or below 95% are possible as well. First wireless network 201 may store or have access to data that correlates RF-quality indications with handoff success rates (e.g., success rates related to whether an eCSFB process was successful for a given RF-quality). This data may comprise data related to a plurality of wireless networks. In another example, this data may be specific to the given coverage area for which the method 400 is applied.

In another example, the threshold may be a given pilot signal strength. For instance, the given pilot signal strength may be an $E_C/I_O$ value less than −100. Further, other suitable threshold numbers and ways of selecting a suitable threshold number are possible as well.

If the determination is that the reported indication of RF quality exceeds the threshold, at step 406, first wireless network 201 sends the reported indication of RF quality to second wireless network 203. For example, the RF-quality reported by UE may be associated with a handoff success rate over 95%, and therefore first wireless network 201 may send the reported indication of RF quality to second wireless network 203. This message may serve as an indication to the second wireless network 203 that the first wireless network 201 is moving forward with an eCSFB process. For instance, after sending the reported indication of RF quality to second wireless network 203, second wireless network 203 may then assign an air-interface traffic channel for UE 202. Second wireless network 203 may next send an indication of the assigned air-interface traffic to first wireless network 201. First wireless network 201 may then receive this indication of the assigned air-interface traffic channel for UE 202 from second wireless network 203, and first wireless network 201 may then send the received indication of the assigned air-interface traffic channel to UE 202. Subsequently, UE 202 may hand off from first wireless network 201 to second wireless network 203 using the assigned traffic channel. Beneficially, UE 202 may quickly move over to operating on that channel of the CDMA network 201, without needing to go through the acquisition process that it would go through with standard CSFB.

On the other hand, if the determination is that the reported indication of RF quality does not exceed the threshold, (i) at step 408, first wireless network 201 directs UE 202 to hand off to second wireless network 203 and (ii) at step 410, first wireless network 201 refrains from sending the reported indication of RF quality to second wireless network 203. In an example, steps 408 and 410 may amount to performing the standard CSFB process (opposed to an eCSFB process).

Since the reported indication of RF quality does not exceed the threshold, first wireless network 201 may direct UE 202 to communicate directly with second network 203 in order to establish connectivity. As such, first wireless network 201 may refrain from sending the reported indication of RF quality to second wireless network 203, since UE 202 will attempt to acquire connectivity with second wireless network 203 by communicating directly with second wireless network 203. In particular, UE 202 may scan for CDMA coverage and may go through the usual acquisition process, including reading the pilot and sync channels, and requesting and receiving assignment of a traffic channel. The CDMA network may then associate that traffic channel with the page to set up a call to the WCD.

In an example embodiment, if the determination is that the reported indication of RF quality exceeds the threshold, after first wireless network 201 sending the reported indication of RF quality to second wireless network 203, first wireless network 201 may suspend service to UE 202. For instance, after UE 202 connects with second wireless network 203, the first wireless network 201 may suspend service. When UE 202 completes the call on the second wireless network 203, the UE 202 may then re-establish service with the first wireless network 201.

Similarly, if the determination is that the reported indication of RF quality does not exceed the threshold, after first wireless network 201 directing UE 202 to hand off to second wireless network 203 and first wireless network 201 refraining from sending the reported indication of RF quality to second wireless network 203, first wireless network 201 may suspend service to UE 202. For instance, after UE 202 connects with second wireless network 203, the first wireless network 201 may suspend service. When UE 202 completes the call on the second wireless network 203, the UE 202 may then re-establish service with the first wireless network 201.

5. Example Benefit of the Disclosed Method and System

As described above, the eCSFB process can be problematic, since it assumes that if a device detects sufficient pilot strength the device will also be able to decode the traffic channel in the detected system. In reality, however, pilots may be stronger than traffic channels. So merely being able to decode a pilot signal does not mean the device will be able to also decode the traffic channel. The CSFB process that includes decoding the sync channel helps to ensure that the device will ultimately be able to decode the traffic channel. However, the eCSFB process excludes decoding of the synch channel.

The proposed method and system beneficially provides an improved way to implement circuit-switched fallback. In particular, the disclosed method and system may select an appropriate way for a WCD to switch from a first wireless network to a second wireless network, based on whether the WCD detects an RF quality of the second wireless network that exceeds a threshold. For instance, the disclosed method and system may help a first wireless network select between implementing a CSFB process or an eCSFB process in order to allow a WCD to switch from a first wireless network to a second wireless network.

By determining whether the detected RF quality exceeds a threshold, the disclosed method and system may beneficially help ensure that the WCD will be able to successfully connect with the second wireless network (e.g., by decoding the synch channel when a WCD is switching from the first wireless network to the second wireless network). Further, by providing this improved way to implement CSFB, the disclosed method and system may in turn improve call quality for WCDs operating in a wireless network. Therefore, the disclosed method and system can help improve call quality overall for users, thus increasing user satisfaction with wireless performance.

6. Conclusion

An exemplary embodiment of the present invention has been described above. Those of ordinary skill in the art will appreciate, however, that numerous changes may be made from the embodiment described without deviating from the scope of the invention as defined by the claims.

We claim:

1. A method comprising:
    a first wireless network receiving from a wireless communication device a report including an indication of radio frequency (RF) quality of a second wireless network;
    the first wireless network making a determination of whether the reported indication of RF quality exceeds a threshold; and
    (i) if the determination is that the reported indication of RF quality exceeds the threshold, the first wireless network sending the reported indication of RF quality to the second wireless network, whereby the second wireless network then assigns an air-interface traffic channel for the wireless communication device and the wireless communication device hands off from the first wireless network to the second wireless network, but (ii) if the determination is that the reported indication of RF quality does not exceed the threshold, the first wireless network directing the wireless communication device to hand off to the second wireless network and the first wireless network refraining from sending the reported indication of RF quality to the second wireless network.

2. The method of claim 1, wherein the reported indication of RF quality is selected from the group consisting of: an indication of a signal strength of the second wireless network measured by the wireless communication device and an indication of a signal-to-noise ratio of the second wireless network measured by the wireless communication device.

3. The method of claim 1, wherein the first wireless network operates according to a first air-interface protocol, wherein the second wireless network operates according to a second air-interface protocol, and wherein the first air-interface protocol is different than the second air-interface protocol.

4. The method of claim 3, wherein the first air-interface protocol comprises a Long-Term Evolution (LTE) protocol, and wherein the second air-interface protocol comprises a Code Division Multiple Access (CDMA) protocol.

5. The method of claim 1, further comprising:
    if the determination is that the reported indication of RF quality exceeds the threshold, the first wireless network, after sending the reported indication of RF quality to the second wireless network, receiving an indication of the assigned air-interface traffic channel for the wireless communication device from the second wireless network; and
    the first wireless network sending the received indication of the assigned air-interface traffic channel to the wireless communication device.

6. The method of claim 1, further comprising:
    (i) if the determination is that the reported indication of RF quality exceeds the threshold, after the first wireless network sending the reported indication of RF quality to the second wireless network, whereby the second wireless network then assigns an air-interface traffic channel for the wireless communication device and the wireless communication device hands off from the first wireless network to the second wireless network, the first wireless network suspending service to the wireless communication device; and
    (ii) if the determination is that the reported indication of RF quality does not exceed the threshold, after the first wireless network directing the wireless communication device to hand off to the second wireless network and the first wireless network refraining from sending the reported indication of RF quality to the second wireless network, the first wireless network suspending service to the wireless communication device.

7. The method of claim 1, wherein the threshold is an RF-quality threshold associated with a given handoff success rate.

8. The method of claim 7, wherein the given handoff success rate is above 95%.

9. The method of claim 1, wherein the threshold is a given pilot signal strength.

10. A wireless network comprising:
    an antenna that radiates to define a coverage area;
    a memory configured to store program instructions; and
    a processor capable of executing the program instructions to:
        (i) receive from a wireless communication device a report including an indication of radio frequency (RF) quality of a second wireless network;
        (ii) make a determination of whether the reported indication of RF quality exceeds a threshold; and (iii) if the determination is that the reported indication of RF quality exceeds the threshold, send the reported indication of RF quality to the second wireless network, whereby the second wireless network then assigns an air-interface traffic channel for the wireless communication device and the wireless communication device hands off from the wireless network to the second wireless network, but (iv) if the determination is that the reported indication of RF quality does not exceed the threshold, direct the wireless communication device to hand off to the second wireless network and refrain from sending the reported indication of RF quality to the second wireless network.

11. The wireless network of claim 10, wherein the reported indication of RF quality is selected from the group consisting of: an indication of a signal strength of the second wireless network measured by the wireless communication device and an indication of a signal-to-noise ratio of the second wireless network measured by the wireless communication device.

12. The wireless network of claim 10, wherein the wireless network operates according to a first air-interface protocol, wherein the second wireless network operates according to a second air-interface protocol, and wherein the first air-interface protocol is different than the second air-interface protocol.

13. The wireless network of claim 12, wherein the first air-interface protocol comprises a Long-Term Evolution (LTE) protocol, and wherein the second air-interface protocol comprises a Code Division Multiple Access (CDMA) protocol.

14. The wireless network of claim 10, wherein the processor is further capable of executing the program instructions to:
if the determination is that the reported indication of RF quality exceeds the threshold, after sending the reported indication of RF quality to the second wireless network, receive an indication of the assigned air-interface traffic channel for the wireless communication device from the second wireless network; and
send the received indication of the assigned air-interface traffic channel to the wireless communication device.

15. The wireless network of claim 10, wherein the processor is further capable of executing the program instructions to:
if the determination is that the reported indication of RF quality exceeds the threshold, after sending the reported indication of RF quality to the second wireless network, whereby the second wireless network then assigns an air-interface traffic channel for the wireless communication device and the wireless communication device hands off from the wireless network to the second wireless network, suspend service to the wireless communication device; and
if the determination is that the reported indication of RF quality does not exceed the threshold, after directing the wireless communication device to hand off to the second wireless network and refraining from sending the reported indication of RF quality to the second wireless network, suspend service to the wireless communication device.

16. The wireless network of claim 10, wherein the threshold is an RF-quality threshold associated with a given handoff success rate.

17. The wireless network of claim 10, wherein the given handoff success rate is above 95%.

18. The wireless network of claim 10, wherein the threshold is a given pilot signal strength.

19. A non-transitory computer readable medium having stored therein instructions that are executable to cause at least one component of a first wireless network to perform functions comprising:
receiving from a wireless communication device a report including an indication of radio frequency (RF) quality of a second wireless network;
making a determination of whether the reported indication of RF quality exceeds a threshold; and
(i) if the determination is that the reported indication of RF quality exceeds the threshold, sending the reported indication of RF quality to the second wireless network, whereby the second wireless network then assigns an air-interface traffic channel for the wireless communication device and the wireless communication device hands off from the first wireless network to the second wireless network, but (ii) if the determination is that the reported indication of RF quality does not exceed the threshold, directing the wireless communication device to hand off to the second wireless network and refraining from sending the reported indication of RF quality to the second wireless network.

20. The non-transitory computer readable medium of claim 19, wherein the wireless network operates according to a first air-interface protocol, wherein the second wireless network operates according to a second air-interface protocol, and wherein the first air-interface protocol is different than the second air-interface protocol.

21. A method comprising:
a first wireless network receiving from a wireless communication device a report including an indication of radio frequency (RF) quality of a second wireless network;
the first wireless network making a determination of whether the reported indication of RF quality exceeds a threshold; and
(i) if the determination is that the reported indication of RF quality exceeds the threshold, the first wireless network performing an enhanced circuit-switched fallback (eCSFB) process, wherein performing the eCSFB process comprises the first wireless network sending the reported indication of RF quality to the second wireless network, whereby the second wireless network then assigns an air-interface traffic channel for the wireless communication device and the wireless communication device hands off from the first wireless network to the second wireless network, but (ii) if the determination is that the reported indication of RF quality does not exceed the threshold, the first wireless network performing a standard circuit-switched fallback (CSFB) process, wherein performing the standard CSFB process comprises the first wireless network directing the wireless communication device to hand off to the second wireless network and the first wireless network refraining from sending the reported indication of RF quality to the second wireless network.

22. A method comprising:
a first wireless network receiving from a wireless communication device a report including an indication of radio frequency (RF) quality of a second wireless network;
the first wireless network making a determination of whether the reported indication of RF quality exceeds a threshold; and
(i) if the determination is that the reported indication of RF quality exceeds the threshold, the first wireless network (a) sending the reported indication of RF quality to the second wireless network, whereby the second wireless network then assigns an air-interface traffic channel for the wireless communication device, (b) after sending the reported indication of RF quality to the second wireless network, receiving an indication of the assigned air-interface traffic channel for the wireless communication device from the second wireless network, and (c) sending the received indication of the assigned air-interface traffic channel to the wireless communication device so as to direct the wireless communication device to hand off, using the assigned air-interface traffic channel, from the first wireless network to the second wireless network, but (ii) if the determination is that the reported indication of RF quality does not exceed the threshold, the first wireless network directing the wireless communication device to hand off to the second wireless network and the first wireless network refraining from sending the reported indication of RF quality to the second wireless network.

* * * * *